Patented Feb. 16, 1954

2,669,537

UNITED STATES PATENT OFFICE 2,669,537

ADRENOCORTICOTROPHIN-GELATIN PREPARATION

Robert E. Thompson, Cos Cob, Conn., assignor to Armour and Company, Chicago, Ill., a corporation of Illinois No Drawing. Application December 27, 1952, Serial No. 328,268

7 Claims. (Cl. 167—74)

This invention relates to an adrenocorticotrophin preparation suitable for intramuscular or subcutaneous injection and having an enhanced adrenocorticotrophic effect.

The present application is a continuation-in-part of my prior copending application Serial No. 179,391, now abandoned, filed August 14, 1950.

The adrenocorticotrophic hormone is a substance secreted by the anterior lobe of the pituitary gland and presumably is carried by the blood stream in the animal body to the adrenal gland where it exerts an influence on the development, growth, and activity of the adrenal cortex. In relatively recent years, extracts of the adrenocorticotrophic hormone derived from the pituitary glands of animals such as hogs, sheep, and cattle have been found extremely effective in alleviating certain pathological conditions in human beings when injected parenterally, and there has been an increasing demand for quantities of the hormone suitable for injection into the human body.

In view of the relatively short supply of animal pituitary glands, from which the adrenocorticotrophic hormone is obtained, and in view of the extremely small size and content of the pituitary glands themselves, it is of importance that methods be developed not only for obtaining the utmost in yield of active substance from the available glands but also for increasing the potency of the active substance to as great an extent as possible.

An object of the present invention is to provide an adrenocorticotrophin preparation which is substantially more potent than the active extract from which the preparation is made. A further object of the invention is to provide a combination of adrenocorticotrophin and carrier which is safe and convenient for intramuscular or subcutaneous injection while at the same time exhibiting a coaction or cooperation between the hormone and carrier resulting in a substantial magnification of adrenocorticotrophic effect. A still further object is to provide a combination of adrenocorticotrophin and carrier which may be combined with other substances so that the resulting preparation possesses not only an enhanced adrenocorticotrophic effect but in addition a long-lasting effect more nearly simulating the natural feeding or secretion of the hormone by the pituitary gland. Other objects and advantages of the invention will appear as the specification proceeds.

In one phase of my invention, I introduce the adrenocorticotrophin substance in a gelatin vehicle. The adrenocorticotrophic hormone employed in combination with gelatin as the vehicle is significantly more potent than the same adrenocorticotrophic hormone injected in an ordinary aqueous solution. The magnification of effect resulting from the use of gelatin has been found to be a doubling or tripling of adrenocorticotrophic potency.

The above-described increase in effect is a true potentiation, as distinguished from a mere retarding effect which may sometimes be caused by the viscosity of the vehicle. This may be illustrated by the fact that a gelatin-adrenocorticotrophin preparation produces, immediately upon injection, a sudden strong response which is substantially in excess of the response caused by an equal dose of the same substance in an aqueous solution from which the gelatin is omitted. I have found that, during the 12 to 16 hours following injection, the pattern of response to a given dose of gelatin-adrenocorticotrophin is similar to that of an identical dose of saline-adrenocorticotrophin, except that the gelatin-adrenocorticotrophin response is always stronger at any particular point of time, as if a much greater dosage had been given. This type of reaction cannot be explained merely on the basis of absorption retardation but it believed to be based on a unique property of the gelatin which is displayed when the gelatin is used in combination with the adrenocorticotrophic hormone but not when it is used with other biologically active substances. Studies on a great number of patients have demonstrated that, by injecting adrenocorticotrophin in gelatin rather than in the usual saline solution, the same general clinical response may be achieved by using only one-half to one-third of the adrenocorticotrophin ordinarily used.

The gelatin employed in the practice of my invention may be any non-antigenic gelatin suitable for parenteral injection. There are numerous pharmaceutical gelatins on the market, each of which has its own characteristic properties, such as source, isoelectric point, pH, viscosity, etc. However, I have found that any of the pharmaceutical gelatins have the effect of increasing the potency of the adrenocorticotrophic hormone, and the only important factors governing suitability for use are the purely practical matters involved in the techniques of parenteral administration. For example, in the administration of a drug contained in a vehicle, it is desirable that the vehicle be fluid, or at least easily liquefied, at room temperature and that its gel point be such that it does not solidify in the injection needle or in the body tissue after injection. In the case of aqueous gelatin solutions which have too high a gel point or viscosity, this may be accomplished by a partial hydrolysis or by decreasing the gelatin concentration, etc. Partial hydrolysis has a further advantage in that the autoclaving step by which hydrolysis is usually accomplished is also effective in insuring that the gelatin is nonantigenic. I prefer to use about a 16% aqueous solution of a partially hydrolyzed pharmaceutical gelatin which is neutral or has an isoelectric point somewhat on the acid side. It is usually desirable that the gelatin concentration be within the range of 5 to 35% by weight of the injection solution, although, as mentioned, this is important mostly from the standpoint of the patient's comfort during or after administration of the hormone, and the effectiveness of the gelatin in increasing adrenocorticotrophin potency is manifested to some degree even at gelatin concentrations above and below these limits.

Any adrenocorticotrophic substance may be used with gelatin to provide the improved adrenocorticotrophic effectiveness contemplated by the present invention. The adrenocorticotrophic hormone has not yet been isolated, and its molecular structure has not as yet been definitely characterized. I prefer to employ a fairly well purified substance, such as the acid hydrolyzed product obtained by Joseph D. Fisher in his copending application Serial No. 122,588, wherein one method of preparing the product involves preparing an acid acetone adrenocorticotrophin powder by known means, removing the bulk of the contaminants by extracting the acid acetone powder with dibasic sodium phosphate solution, precipitating the adrenocorticotrophic substance from the dibasic sodium phosphate solution by adding ammonium sulfate, centrifuging, resuspending the precipitate in distilled water, dialyzing, adjusting the pH to about 1.3 with hydrochloric acid, boiling at 100° C. for about 2½ hours, and then dialyzing and lyophilizing; or the pepsin hydrolyzed product described by Lottie J. Walaszek in her copending application Serial No. 172,011 wherein one method which is described for preparing the product involves hydrolyzing a relatively pure adrenocorticotrophic substance with pepsin, treating the pepsin hydrolyzed substance with trichloroacetic acid to precipitate inert materials, washing the unprecipitated material with a solvent, such as ether, which dissolves the trichloroacetic acid but which does not dissolve the hormone substance, and dialyzing the solution; or the cellulose purified product obtained by Irby M. Bunding in his copending application Serial No. 179,650 wherein one method which is described for preparing the product involves suspending a relatively purified adrenocorticotrohic substance in a solution containing finely divided filter paper (a cellulose material) in order to absorb the adrenocorticotrophin on the paper, separating the solid phase from the liquid, washing the solid material, eluting the absorbed adrenocorticotrophin from the filter paper with hydrochloric acid, and lyophilizing the solution containing the hormone substance; etc. However, I have found that all of the known adrenocorticotrophin substances, regardless of their source or preparative history, display a substantially increased potency when used with gelatin, as compared with their potency when the gelatin is omitted.

The exact manner in which the active substance and the gelatin coact or cooperate to provide the increased potency is not known with certainty at the present time. However, a possible explanation may be that there are, in the tissues surrounding the site of injection of the adrenocorticotrophic hormone, certain agents which have a specific destructive force upon the adrenocorticotrophin, although apparently not upon other injected drugs. This possibility is supported by experiments described in an article entitled "Inactivation of Adrenocorticotrophic Hormone in Vitro by Tissues" by I. I. Geschwind and C. H. Li (Endocrinology, vol. 50, No. 2, p. 226, February 1952), where it is stated that certain body tissues have been found to have an inactivating effect on ACTH. In view of this, it appears that when the adrenocorticotrophic hormone is injected subcutaneously or intramuscularly, it is exposed to these destructive forces in the surrounding tissue, and therefore a substantial portion of its activity is lost before being released into the blood stream for transfer to the adrenal glands. However, gelatin, when used in combination with the adrenocorticotrophic hormone, appears to possess a specific stabilizing effect upon the hormone, thus protecting it against inactivation by the destructive forces in the tissue surrounding the site of injection and consequently enabling the full active dose of hormone to reach the blood stream wherein it is carried safely to the adrenals.

In another phase of my invention, I introduce the adrenocorticotrophin-gelatin product in association with a retarding agent compatible with gelatin, thereby obtaining the benefits not only of increased potency but also of prolonged therapeutic activity. As the retarding agent, I may use any of the well-known substances which reduce the rate of absorption of the drug in the blood stream either by virtue of the viscosity or the astringent properties of these substances. For example, an astringent such as aluminum phosphate may be employed. Similarly, the retarding agent may be aluminum hydroxide, magnesium phosphate, and related materials which are difficultly water-soluble astringents. Other retarding agents, such as polyvinyl pyrrolidone, which depends on its viscous character for retarding release of the hormone into the blood stream, may be used, or combinations of such astringents and viscous vehicles have been found effective when used in association with the adrenocorticotrophin-gelatin product of the present invention.

More specifically, one embodiment of this latter phase of the invention may be carried out in the following manner: The astringent material, such as aluminum phosphate, for example, in fine particulate form is prepared in distilled water, and the suspension is added to the adrenocorticotrophic hormone preparation. The gelatin solution is then added and the whole mixed thoroughly. After sterilization, the material is ready for injection. In further specific embodiments, polyvinyl pyrrolidone may either be substituted for the aluminum phosphate, or used in addition thereto.

The ratio of the astringent to the adrenocorticotrophic hormone substance may vary considerably depending upon the effects desired. In the case where aluminum phosphate is used as the astringent, for example, I prefer to have at least one-half as much aluminum phosphate as the adrenocorticotrophic hormone solids. It is undesirable to use much more than twice as much aluminum phosphate as the hormone substance because of local irritation. A preferred range is from one-half to two times as much aluminum phosphate as the hormone substance solids, and I prefer to use an amount of aluminum phosphate equal to the amount of the hormone; for example, 25 mg. adrenocorticotrophic hormone substance for 25 mg. aluminum phosphate. It will be understood, however, that such ratios may be varied considerably depending upon the medical effects to be achieved.

Specific examples of the products of my invention and methods of their preparation are described as follows:

EXAMPLE I

A lyophilized adrenocorticotrophin product prepared by the method described in Fisher application Serial No. 122,588, was reconstituted with distilled water, and one volume of this solution was added to one volume of a solution containing 32% by weight of a partially hydrolyzed gelatin and 1% phenol.

The resulting combined solution, containing 16% gelatin and 0.5% phenol in addition to the adrenocorticotrophin, was subjected to standard biological and clinical assay and was found to be from two to three times as potent as the original adrenocorticotrophin administered in ordinary saline.

EXAMPLE II

A lyophilized adrenocorticotrophin product was prepared as follows: Crude pork pituitary glands, immediately after being removed from the animal, were frozen and kept in a frozen condition until they were ready to be processed. The glands were then ground with dry ice and then, after adding a solution of an organic solvent, the frozen glands were thawed as rapidly as possible. The thawed glands were extracted in an aqueous medium which contained acetone at a pH of about 1.5. After extraction, the meat was separated from the liquid in a centrifuge, and the centrifugate was treated with additional acetone to bring the percentage of acetone to about 90%, at which point precipitation occurred. The precipitate was separated from the liquor, dissolved in water, and subsequently dried. The powder thus obtained was extracted with a 0.1 N solution of dibasic sodium phosphate and the material separated in a centrifuge. The supernatant material remaining after separation was one-half saturated with ammonium sulphate to form a precipitate and was again centrifuged. The precipitate was dialyzed for three days in the cold to remove the ammonium sulphate. In this step the active substance does not dialyze out. The active material was then lyophilized.

The above lyophilized product, which is of the type sometimes referred to as "whole protein" adrenocorticotrophin, and which displays an inability to dialyze through an ordinary dialysis membrane, was reconstituted with distilled water, and one volume of this was added to one volume of a solution containing 32% by weight of a partially hydrolyzed gelatin and 1% phenol.

The resulting combined solution, containing 16% gelatin and 0.5% phenol in addition to the adrenocorticotrophin, was subjected to standard assay and was found to be from 2 to 3 times as potent as the original adrenocorticotrophin administered in ordinary saline.

EXAMPLE III

A quantity of adrenocorticotrophin was prepared by extracting acetone dehydrated anterior pituitaries of hogs with glacial acetic acid at 70° C.; adding ½ volume of acetone and a small portion of NaCl to the solution precipitate unwanted materials; adding an equal volume of ethyl ether to the solution to precipitate a crude adrenocorticotrophin; purifying the precipitate by adsorption on oxycellulose and elution therefrom; and adding an anion exchange resin to the eluate to convert the adrenocorticotrophin to the acetate.

The acetate solution thus formed contained adrenocorticotrophin in the so-called polypeptide form and a portion of this was diluted one volume to one volume with a solution containing 32% gelatin and 1% phenol to produce a combined solution containing 16% gelatin and ½% phenol. This was assayed by the standard U. S. P. method involving the adrenal ascorbic acid depletion test on hypophysectomized rats and also by standard clinical methods and was found to have a potency at least twice that of the same adrenocorticotrophin substance assayed in ordinary aqueous vehicle containing ½% phenol but no gelatin.

EXAMPLE IV

*Preparation of adrenocorticotrophin aluminum phosphate in gelatin. 25 mg. adrenocorticotrophine per cc. (in terms of Standard)*

1. Prepared a quantity (one liter) of aluminum phosphate suspension by mixing equal volumes of reagent grade aluminum chloride and reagent grade trisodium phosphate in concentration calculated to yield 20 mg. AlPO₄ per cc. after mixing. The preparation was centrifuged and reconstituted with distilled water five times to wash out the NaCl resulting from the reaction involved. It was then readjusted to 20 mg. AlPO₄ per cc. with distilled water on the basis of chemical analysis. Added 2 mg./cc. of a quaternary ammonium compound (Zephiran).

2. Prepared the following:

| | | |
|---|---|---|
| Gelatin (non-antigenic) | grams | 72.0 |
| Dextrose (anhydrous) | do | 32.0 |
| Acetic acid | cc | 2.0 |
| Distilled water | cc | 130.0 |

The ingredients were mixed and melted on a boiling water bath. The resulting solution was clarified by subjecting it to a vacuum to remove air bubbles.

3. Weighed 700 milligrams adrenocorticotrophin (potency 350±77 per cent of Standard). Added to this 35.0 cc. of aluminum phosphate suspension 20 mg./cc. (prepared in step 1). Let stand for one hour.

4. Added the 35.0 cc. of preparation in step 3 to 35 cc. of the preparation in step 2. Mixed thoroughly by warming and shaking the finished preparation.

5. The product was filled into 10 cc. vials and capped with closures suitable to allow withdrawal by means of a hypodermic syringe and needle.

6. The vials containing the product were autoclaved for 20 minutes at 15 lb. pressure in order to sterilize the contents.

7. Samples were submitted to the following control tests with the indicated results:

Toxicity in guinea pigs---- No toxic symptoms.
Sterility ------------------ Sterile.
Adrenocorticotrophin potency by adrenal ascorbic acid depletion in hypophysectomized rats. -- 25 mg. Standard per cc.

8. The product was labeled, packaged and tested clinically.

EXAMPLE V

*Preparation of adrenocorticotrophin aluminum phosphate in gelatin*

1. Prepared the following:

| | |
|---|---|
| Gelatin (non-antigenic)---------grams-- | 60.0 |
| Procaine hydrochloride-------------do---- | 5.0 |
| Chlorobutanol --------------------do---- | 1.0 |
| Trisodium phosphate--------------do---- | 2.0 |
| Distilled water-------------------cc-- | 166.0 |

The ingredients were mixed and melted on a water bath. The resulting solution was clarified by subjecting it to a vacuum to remove air bubbles.

2. Prepared washed AlPO₄ suspension 20 mg. per cc. as in step 1, Example IV.

3. Placed 1.0 gram adrenocorticotrophin (potency 350±77 per cent of Standard) into a suitable container. Added 25 cc. aluminum phosphate suspension (prepared in step 2). Allowed to stand thirty minutes. Then added 75 cc. of the preparation made in step 1. The preparation was mixed thoroughly with the aid of heat and agitation.

4. The finished bulk lot was filled into 10 cc. vials and sealed with rubber closures.

5. The vials containing the product were autoclaved at 15 lb. pressure for thirty minutes to sterilize the contents.

6. Samples were subjected to control tests with the indicated results:

Toxicity in guinea pigs---- No toxic symptoms.
Sterility ------------------ Sterile.
Adrenocorticotrophin potency by adrenal ascorbic acid depletion in hypophysectomized rats. -- 28 mg. Standard per cc.

7. The product was labeled, packaged and tested clinically.

EXAMPLE VI

1. Prepare a solution of adrenocorticotrophin in water about 1 per cent concentration.

2. Prepare an aqueous colloidal suspension of aluminum phosphate 20 to 50 mg./cc.

3. Add the preparation of step 2 to the preparation of step 1 to provide a 10 to 25 mg. AlPO₄ for each 25 mg. adrenocorticotrophin (Standard potency). Mix and let stand one hour. Lyophilize.

4. Prepare a solution of gelatin, 7½%, and polyvinyl pyrrolidone, 10%, in water.

5. Add the preparation of step 4 above to the preparation of step 3 above, with trituration, to produce a colloidal suspension containing desired concentration of adrenocorticotrophin.

6. Vial the product and sterilize by means of heat.

EXAMPLE VII

1. Weigh a suitable quantity of adrenocorticotrophin.

2. Prepare a solution of 7½% gelatin and 10% polyvinyl pyrrolidone in water.

3. Add the preparation of step 2 above to the preparation of step 1 above, with trituration, to provide the desired concentration of adrenocorticotrophin. Adjust pH to 3.0 to 4.0 to provide clear or nearly clear solution.

4. Vial the product and sterilize by means of heat.

Whenever the word "Standard" is referred to herein, I mean the "International Standard" which has been adopted by the World Health Organization. One "unit" under the International Standard is defined as equivalent to the potency of 1 mg. of preparation LA-1-A when tested by the method of M. Sayers, G. Sayers, and L. A. Woodbury, Endocrinology, 42, 379 (1948).

While in the foregoing specification specific embodiments of this invention have been set out in considerable detail for the purpose of illustration, it will be apparent to those skilled in the art that many of the details set forth can be varied widely without departing from the spirit of the invention.

I claim:

1. An adrenocorticotrophin preparation suitable for parenteral administration, comprising adrenocorticotrophin substance and non-antigenic pharmaceutical gelatin.

2. An adrenocorticotrophin preparation suitable for parenteral administration, comprising adrenocorticotrophine substance and a 16% aqueous solution of non-antigenic pharmaceutical gelatin.

3. An adrenocorticotrophin preparation suitable for parenteral administration, comprising adrenocorticotrophin substance, non-antigenic pharmaceutical gelatin, and polyvinyl pyrrolidone.

4. An adrenocorticotrophin preparation suitable for parenteral administration, comprising adrenocorticotrophin substance, non-antigenic pharmaceutical gelatin, and a non-toxic difficultly water-soluble astringent selected from the group consisting of aluminum phosphate, aluminum hydroxide, and magnesium phosphate.

5. An adrenocorticotrophin preparation suitable for parenteral administration, comprising adrenocorticotrophin substance, non-antigenic pharmaceutical gelatin, and aluminum phosphate.

6. An adrenocorticotrophin preparation suitable for parenteral administration, comprising adrenocorticotrophin substance, non-antigenic pharmaceutical gelatin, polyvinyl pyrrolidone, and a non-toxic difficultly water-soluble astringent selected from the group consisting of aluminum phosphate, aluminum hydroxide, and magnesium phosphate.

7. An adrenocorticotrophin preparation suitable for parenteral administration, comprising adrenocorticotrophin substance, non-antigenic pharmaceutical gelatin, polyvinyl pyrrolidone, and aluminum phosphate.

ROBERT E. THOMPSON.

(References on following page)

References Cited in the file of this patent

UNITED STATES PATENTS

| Number | Name | Date |
|---|---|---|
| 1,860,469 | Lautenschlager | May 31, 1932 |
| 2,190,183 | Friedrich | Feb. 13, 1940 |
| 2,202,029 | Sevag | May 28, 1940 |
| 2,337,823 | Junkmann | Dec. 28, 1943 |
| 2,413,419 | Saunders | Dec. 31, 1946 |
| 2,415,719 | Abramson | Feb. 11, 1947 |
| 2,474,729 | Durel | June 28, 1949 |
| 2,487,975 | Koree | Nov. 15, 1949 |
| 2,491,537 | Welch | Dec. 20, 1949 |

FOREIGN PATENTS

| Number | Country | Date |
|---|---|---|
| 225,886 | Switzerland | June 16, 1943 |

OTHER REFERENCES

"Recent Progress in Hormone Research," vol. II, pages 1-73 (pages 5, 37-46 and 73 are especially pertinent); pub. 1952 by Academic Press Inc.

Hayashida et al., Endocrinology, vol. 50, No. 2, Feb. 1952, pages 187-191. (Copy in Pat. Off. Sci. Libr.)

Bates, Endocrinology, vol. 52, Mar. 1953, pages 266-271.

Carlinfanti in Mfg. Chemist, Apr. 1949, vol. 20, page 157.

Pincus, "The Hormones," vol. I, 1948, pages 665-673.

"Unlisted Drugs," vol. 2, Aug. 31, 1950, No. 8, page 85.

Endocrinology, vol. 50, Feb. 1952, pages 274-276, article by Farrell et al.

"Schafer's Essentials of Histology," pub. 1949. 15th ed., pages 96 and 280-288.